United States Patent
Teglia

(10) Patent No.: US 9,563,787 B2
(45) Date of Patent: *Feb. 7, 2017

(54) PROTECTION OF A NON-VOLATILE MEMORY BY CHANGE OF INSTRUCTIONS

(71) Applicant: STMicroelectronics (Rousset) SAS, Rousset (FR)

(72) Inventor: Yannick Teglia, Belcodene (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,159

(22) Filed: Mar. 3, 2016

(65) Prior Publication Data

US 2016/0188900 A1   Jun. 30, 2016

Related U.S. Application Data

(63) Continuation of application No. 14/848,747, filed on Sep. 9, 2015, now Pat. No. 9,311,510, which is a (Continued)

(30) Foreign Application Priority Data

May 4, 2011   (FR) ...................................... 11 53804

(51) Int. Cl.
*G06F 7/04* (2006.01)
*G06F 17/30* (2006.01)
(Continued)

(52) U.S. Cl.
CPC ....... *G06F 21/6218* (2013.01); *G06F 12/1425* (2013.01); *G06F 12/1483* (2013.01); *G06F 21/561* (2013.01); *G06F 21/566* (2013.01); *G06F 21/79* (2013.01); *G06F 2212/1052* (2013.01); *G06F 2221/034* (2013.01)

(58) Field of Classification Search
CPC .. G06F 12/1483; G06F 12/1425; G06F 21/52; G06F 21/79; G06F 2212/1052; G06F 9/44589

See application file for complete search history.

(56) References Cited

U.S. PATENT DOCUMENTS 6,779,101 B1   8/2004   Berg et al.
6,895,508 B1   5/2005   Swanberg et al.
(Continued)

FOREIGN PATENT DOCUMENTS

EP   1 507 185 A1   2/2005
FR   2 859 548 A1   3/2005

OTHER PUBLICATIONS

Kuperman et al, Prevention and Detection of Stack Buffer Overflow Attacks, 2005.*

(Continued)

*Primary Examiner* — Eleni Shiferaw
*Assistant Examiner* — Huan V Doan
(74) *Attorney, Agent, or Firm* — Seed IP Law Group LLP

(57) ABSTRACT

A method for protecting a volatile memory against a virus, wherein: rights of writing, reading, or execution are assigned to certain areas of the memory; and a first list of opcodes authorized or forbidden as a content of the areas is associated with each of these areas.

17 Claims, 1 Drawing Sheet

Related U.S. Application Data continuation of application No. 13/458,138, filed on Apr. 27, 2012, now Pat. No. 9,165,165.

(51) Int. Cl.
*H04N 7/16* (2011.01)
*G06F 21/62* (2013.01)
*G06F 21/56* (2013.01)
*G06F 21/79* (2013.01)
*G06F 12/14* (2006.01)

(56) References Cited

U.S. PATENT DOCUMENTS

| | | |
|---|---|---|
| 7,971,255 B1 | 6/2011 | Ke et al. |
| 2003/0154468 A1* | 8/2003 | Gordon ............... G06F 9/44589 717/143 |
| 2004/0255124 A1 | 12/2004 | Courcambeck et al. |
| 2005/0010804 A1* | 1/2005 | Bruening ................ G06F 21/52 726/1 |
| 2005/0210284 A1 | 9/2005 | Catherwood |
| 2007/0226795 A1 | 9/2007 | Conti et al. |
| 2007/0266214 A1* | 11/2007 | Ohyama .............. G06F 12/1441 711/163 |
| 2008/0086738 A1 | 4/2008 | Nieminen |
| 2009/0007223 A1 | 1/2009 | Centonze et al. |
| 2010/0088705 A1* | 4/2010 | Attinella ............. G06F 12/1441 718/102 |
| 2010/0100962 A1 | 4/2010 | Boren |
| 2010/0174882 A1 | 7/2010 | Zipperer |
| 2011/0167496 A1* | 7/2011 | McPhail ................. G06F 21/72 726/24 |

OTHER PUBLICATIONS

French Search Report and Written Opinion, dated Dec. 27, 2011, for corresponding French Application No. 1153804, 8 pages.
French Search Report and Written Opinion, dated Dec. 27, 2011, for corresponding French Application No. 1153805, 8 pages.
Snow, "Memory Exploits and Defenses," Sep. 2012, 79 pages.

* cited by examiner

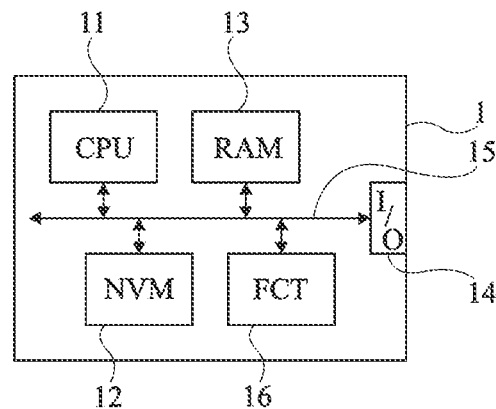
Fig 1
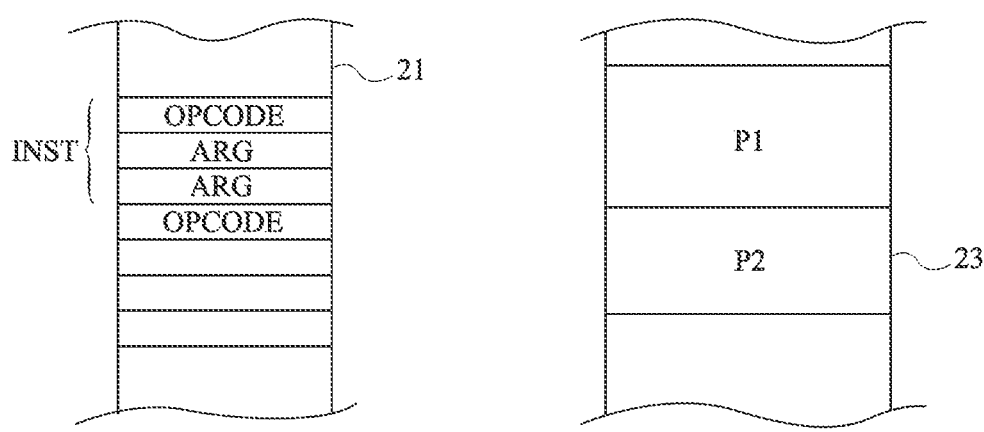
Fig 2
Fig 3
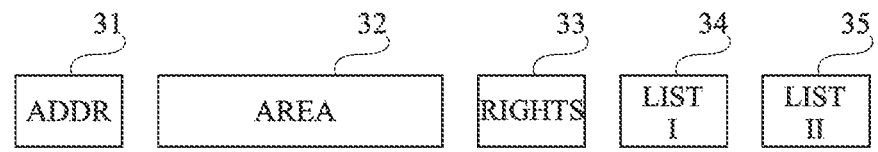
Fig 4

PROTECTION OF A NON-VOLATILE MEMORY BY CHANGE OF INSTRUCTIONS

BACKGROUND

Technical Field

Embodiments generally relate to electronic circuits and, more specifically, to circuits equipped with volatile memories, be they temporary storage RAMs or processing unit execution stacks.

Embodiments more specifically relate to the protection of such volatile storage elements against virus attacks.

Description of the Related Art

Whether in a RAM where a program is stored for execution or in a dynamic processing unit stack where the instructions are successively placed for the execution of this program, the corresponding memory areas are particularly sensitive to virus-type attacks.

Two main categories of viruses are known.

Viruses of a first category take the place of the program, that is, modify the opcodes (and sometimes also the arguments) of some instructions so that the program carries out another task than that for which it is initially provided.

Viruses of a second category can be considered as external to the executed program and have the function of modifying the data, that is, the values of the arguments manipulated by the legitimate program, especially when said arguments are stored in the program execution stack.

Countermeasures which affect rights of writing, reading, or execution on files or memory areas are known. Thus, if a virus attempts to carry out a forbidden action of the concerned memory area, it is not allowed to do it. However, such measures are often considered as insufficient. In particular, an area where it is usual to execute a program is accessible in write and in execution mode. A virus can thus replace, in this area, a program or a program portion and execute it. Similarly, a virus can modify the data contained in the execution stack.

BRIEF SUMMARY

An embodiment provides a solution intended for a virus tending to modify the instructions of a program. An embodiment provides a solution intended for a virus, external to an executed program, aiming at replacing instruction operands.

An embodiment provides a method for protecting a volatile memory against a virus, wherein:

rights of writing, reading, or execution are assigned to certain areas of the memory; and a first list of opcodes authorized or forbidden as a content of the areas is associated with each of these areas.

According to an embodiment, said list is stored at the same address as the concerned area.

According to an embodiment, said list is stored in a table separate from the concerned area.

According to an embodiment, the volatile memory is a RAM.

According to an embodiment, the volatile memory is a stack associated with a processing unit.

According to an embodiment, a second list of opcodes for which the access to the areas is authorized or forbidden is associated with each of these areas.

Another embodiment provides an electronic circuit capable of implementing the above method.

BRIEF DESCRIPTION OF THE SEVERAL VIEWS OF THE DRAWINGS

FIG. 1 is a very simplified block diagram of an example of an electronic system of the type to which the embodiments which will be described apply as an example;

FIG. 2 illustrates an example of a dynamic instruction storage stack associated with a processing unit;

FIG. 3 illustrates in simplified fashion an example of the content of a RAM-type volatile memory; and FIG. 4 is a simplified representation of an embodiment of a method for protecting a volatile memory.

DETAILED DESCRIPTION

The same elements have been designated with the same reference numerals in the different drawings. For clarity, only those elements and steps which are useful to the understanding of the embodiments have been shown and will be described. In particular, the destination of the protected programs or data has not been detailed, the embodiment being compatible with usual destinations of such programs to be protected against viruses. Further, the content of the volatile memories targeted by the described embodiments has only been detailed where this clarifies the discussion.

FIG. 1 is a very simplified representation of an embodiment of an electronic circuit to which the embodiments apply as an example. Circuit 1 comprises a processing unit 11 (CPU) associated with one or several non-volatile memories 12 (NVM) and with one or several RAMs 13, as well as one or several instruction stacks generally contained in a RAM. The different elements of circuit 1 communicate together and with a wire or contactless input/output interface 14 (I/O), via a data, control, and address bus 15. Circuit 1 may comprise other elements symbolized by a block 16 (FCT) performing other functions (for example, a cryptoprocessor, sensors, other electronic elements, etc.).

Central processing unit 11 comprises registers (not shown in FIG. 1) into which the instructions being executed are temporarily transferred. These instructions generally originate from RAM 13 into which programs for example contained in non-volatile memory 12 or originating from the outside of circuit 1 via interface 15 are transferred to be executed.

FIG. 2 is a very simplified representation of an execution sequence 21 associated with processing unit 11. Each instruction (INST) is most often formed of an opcode (OPCODE) associated with arguments (ARG). The arguments are either addresses or data processed by the opcode. The number of arguments depends on the concerned instruction. The execution sequence is accessed by the processing unit.

Some instructions in the sequence aim at manipulating the program execution stack. One can in particular find the following instructions:

PUSH to stack a piece of data (value or address);

POP to pop a piece of data (value or address);

CALL to stack, in particular, the return address of the calling function, that is, that which performs the CALL, and jump to the address of the called function; and RET to pop a return address and jump to it.

FIG. 3 is a very simplified representation of a RAM memory plane 23. This memory plane comprises one or several programs (P1 and P2 in the example of FIG. 3) which are transferred, for their execution, either from a non-volatile memory, or from the outside of the circuit. This program is then accessed by the central processing unit. The execution stack is generally stored in this memory.

The elements of FIG. 2 and of FIG. 3 will be referred to as volatile memory elements. Such volatile memory elements are likely to be attacked by computer viruses.

In the embodiments which will be described, it is provided to assign authorized opcodes (OPCODE) to volatile memory areas (execution stack or RAM). Such a solution adds a granularity to usual protections, which only assign rights in reading, writing, or execution to these memory areas.

FIG. 4 illustrates an embodiment according to which, to each address 31 (ADDR) of the volatile memory pointing to a memory content area 32 (AREA), are assigned not only one or several rights 33 (RIGHT) among rights of execution, reading, or writing, but also one or several lists 34, 35 (LIST I, LIST II) of authorized opcodes.

Each memory area is thus "tattooed" with the list of authorized instructions for this area, relatively to the program destination, that is, relatively to the semantics of the executed function. For example, if it is an area of arithmetic calculation to be executed linearly, all arithmetical opcodes will be authorized, but jumping operations will be forbidden.

The nature of the opcodes depends on the electronic circuit and on the language used by the processing unit. Further, although these codes have been expressed more or less intelligibly, they of course in practice are digital codes.

According to an embodiment, the authorized or forbidden opcodes concern the content of area 32.

The fact of adding, to memory areas identified by their addresses, opcodes authorized or forbidden as a content of the addressed areas, prevents a virus external to the program which would be downloaded into a memory area or into the processing unit stack, to efficiently replace program instructions. Indeed, although a replacement of the instructions by this virus remains possible, if these instructions contain a non-authorized opcode on the corresponding memory area, the access is denied and the virus becomes inefficient. To counteract this protection, the virus would have to be able to identify the authorized opcodes in the area where it desires to write. This becomes particularly complicated and non-profitable for an attacker.

In a simplified embodiment, it may be provided for a RAM to have, according to areas, set authorized opcodes in the different addresses. This, however, limits the possibilities of using a same memory area for different programs.

Thus, in one embodiment, the opcodes assigned to the different memory areas are capable of being modified for each loading of a program into the memory area.

The list of authorized or forbidden codes is stored, for example, in additional memory words or registers at the addresses of the concerned areas. As a variation, a separate table storing, for each address or address area, the list of authorized and forbidden opcodes is provided.

A coding of the groups of opcodes may also be provided to assign a same value to a set of licit or illicit operations for a same memory area.

In an embodiment, a countermeasure intended for a virus which will modify the instruction operands of a program to use this instruction for other purposes is provided.

The countermeasure discussed in relation with the first aspect may not be sufficiently efficient since the opcode associated with the address at which the instruction is located is, in this case, actually authorized.

According to an embodiment, the memory areas are assigned a list of opcodes capable of accessing this area. As compared with the first mode, the case in point is not to authorize or to forbid for the area to contain such and such an opcode in an instruction, but to authorize or forbid for the information contained in the area to be accessed by such and such an opcode.

In an embodiment, this countermeasure comes as a complement to the rights of access in reading, writing, or execution, to the concerned area.

Without the first countermeasure, a virus may modify instructions in memory areas to replace such and such a program. Further, an external virus modifying the argument of an instruction may start being executed. However, if the address introduced by the virus as an argument of the instruction points to a memory area where the instruction (its opcode) is not authorized by the second countermeasure, the value of the area is not affected. Accordingly, the virus has no effect.

The memory portions likely to being vulnerable to an external virus are thus considerably limited.

As in the first countermeasure, implementing the second countermeasure includes associating, with each address or group of addresses, a list of authorized or forbidden opcodes (block 35, LIST II, FIG. 4). The difference is that it lists the codes having or not the right to access area 32 while LIST I lists the codes authorized or forbidden in area 32.

Still as in the first countermeasure, the definition of the authorized or forbidden opcodes may, in a simplified embodiment, be set, or in a more advanced implementation, be updated on each loading of the program into the memory.

Embodiments may be employed together with existing solutions. The two above-described countermeasures may of course be combined.

Various embodiments have been described. Various alterations, modifications, and improvements will occur to those skilled in the art. Further, the practical implementation of the described embodiments is within the abilities of those skilled in the art based on the functional indications given hereabove. The price to pay to implement these embodiments may be a table or an additional memory area containing the authorized or forbidden opcodes for each of the areas.

Further, the action to be taken after a rule violation (attempt of access to a non-authorized area or to write a non-authorized code into an area) may vary according to applications. It may be provided to block the circuit, to warn the user, or to simply reject the instruction, etc.

The granularity desired for the memory areas to be protected depends on the application. This granularity may be word per word, word group per word group, etc. The finer the granularity, the better the protection, but the more additional memory which may be consumed.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
assigning rights of writing, reading, or execution to at least one area of a volatile memory, the at least one area being used to store instructions of at least one program;
associating, with the at least one area used to store instructions of the at least one program and assigned the rights of writing, reading, or execution, a first list of opcodes that are authorized or not authorized to be stored as content of the at least one area, the first list of opcodes being selected based on semantics of executed functions of the at least one program for which the at least one memory area is used;
in response to an attempt to store an opcode of an instruction in the at least one area of the volatile memory, determining, using at least one processor, whether the opcode of the instruction is indicated in the first list of opcodes as an opcode that is authorized to be stored in the at least one area of the volatile memory; and
performing, using the at least one processor, an action if it is determined that the first list of opcodes indicates that the opcode of the instruction is not authorized to be stored in the at least one area of the volatile memory, wherein the at least one program is a first program, and the method comprises:
in response to the at least one area being used for a second program different from the first program, associating the at least one area with a second list of opcodes selected based on semantics of executed functions of the second program, the second list of opcodes being different from the first list of opcodes.

2. The method of claim 1 wherein the volatile memory is a random access memory (RAM).

3. The method of claim 1, further comprising:
associating with the at least one area a second list of opcodes for which access to the at least one area is authorized or not authorized.

4. The method of claim 1, comprising:
updating the first list of opcodes when the at least one program is loaded into the volatile memory.

5. The method of claim 1 wherein the action is selected from a group comprising: providing an indication to a user indicating the attempt, blocking an electronic circuit associated with the volatile memory, and blocking the instruction.

6. An electronic circuit comprising:
processing circuitry; and
memory storing computer-executable instructions that, when executed by the processing circuitry, perform a method for protecting a volatile memory against a virus, the method comprising:
assigning rights of writing, reading, or execution to at least one area of the volatile memory;
associating, with the at least one area being used to store instructions of at least one program and assigned the rights of writing, reading, or execution, a first list of opcodes that are authorized or not authorized to be stored as content of the at least one area, the first list of opcodes being selected based on semantics of executed functions of the at least one program for which the at least one memory area is used;
in response to an attempt to store an opcode of an instruction in the at least one area of the volatile memory, determining whether the opcode of the instruction is indicated in the first list of opcodes as an opcode that is authorized to be stored in the at least one area of the volatile memory; and
allowing the opcode of the instruction to be stored in the at least one area of the volatile memory if it is determined that the first list of opcodes indicates that the opcode of the instruction is authorized to be stored in the at least one area of the volatile memory wherein the at least one program is a first program, and the method comprises:
in response to the at least one area being used for a second program different from the first program, associating the at least one area with a second list of opcodes selected based on semantics of executed functions of the second program, the second list of opcodes being different from the first list of opcodes.

7. The electronic circuit of claim 6 wherein:
the volatile memory is a random access memory (RAM).

8. The electronic circuit of claim 6 wherein:
the first list of opcodes comprises at least one first opcode that is authorized as content of the at least one area and at least one second opcode that is not authorized as content of the at least one area.

9. A system, comprising:
processing circuitry; and
volatile memory comprising at least one area, which, in operation, stores instructions of at least one program, wherein:
the at least one area is associated with a first plurality of opcodes that are authorized or not authorized to be stored as content of the at least one area, the first plurality of opcodes being selected based on semantics of executed functions of the at least one program for which the at least one memory area is used; and
the processing circuitry, in operation:
responds to an attempt to store an opcode of an instruction in the at least one area of the volatile memory by determining whether the opcode of the instruction is indicated in the first list of opcodes as an opcode that is authorized to be stored in the at least one area of the volatile memory; and
allows the opcode of the instruction to be stored in the at least one area of the volatile memory if it is determined that the first list of opcodes indicates that the opcode of the instruction is authorized to be stored in the at least one area of the volatile memory wherein the at least one program is a first program, and the processing circuitry, in response to the at least one area being used for a second program different from the first program, associates the at least one area with a second plurality of opcodes selected based on semantics of executed functions of the second program, the second list of opcodes being different from the first list of opcodes.

10. The system of claim 9 wherein:
the second plurality of opcodes is a list of opcodes that are authorized or not authorized to access the at least one area.

11. A non-transitory computer-readable medium storing instructions which, when executed by processing circuitry, cause the processing circuitry to perform a method to protect a volatile memory against a virus, the method comprising:
assigning rights of writing, reading, or execution to at least one area of the volatile memory being used to store instructions of at least one program;
associating, with the at least one area being used to store instructions of at least one program and assigned the rights of writing, reading, or execution, a first list of opcodes that are authorized or not authorized to be stored as content of the at least one area, the first list of opcodes being selected based on semantics of executed functions of the at least one program for which the at least one memory area is used;

in response to an attempt to store an opcode of an instruction in the at least one area of the volatile memory, determining whether the opcode of the instruction is indicated in the first list of opcodes as an opcode that is authorized to be stored in the at least one area of the volatile memory; and allowing the opcode of the instruction to be stored in the at least one area of the volatile memory if it is determined that the first list of opcodes indicates that the opcode of the instruction is authorized to be stored in the at least one area of the volatile memory wherein the at least one program is a first program, and the method comprises:

in response to the at least one area being used for a second program different from the first program, associating the at least one area with a second list of opcodes selected based on semantics of executed functions of the second program, the second list of opcodes being different from the first list of opcodes.

12. The non-transitory computer-readable medium of claim 11 wherein:

the volatile memory is a random access memory (RAM).

13. The non-transitory computer-readable medium of claim 11 wherein:

the first list of opcodes comprises at least one first opcode that is authorized as content of the at least one area and at least one second opcode that is not authorized as content of the at least one area.

14. The non-transitory computer-readable medium of claim 11 wherein the method comprises:

associating with the at least one area a second list of opcodes that are authorized or not authorized to access the at least one area.

15. The non-transitory computer-readable medium of claim 11 wherein the first list of opcodes is stored at the same address as the at least one area.

16. The non-transitory computer-readable medium of claim 11 wherein the first list of opcodes is stored in a table separate from the at least one area.

17. The non-transitory computer-readable medium of claim 11 wherein the at least one area is an instruction stack.

\* \* \* \* \*